(12) United States Patent
Jones et al.

(10) Patent No.: US 6,810,196 B2
(45) Date of Patent: Oct. 26, 2004

(54) VARIABLE ATTENUATOR FOR OPTICAL FIBER APPLICATIONS

(75) Inventors: Sean L. Jones, Clarkston, GA (US); Francis G. McCormack, Cumming, GA (US); David N. Ridgeway, Conyers, GA (US); Ian A. White, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/703,785

(22) Filed: Nov. 6, 2003

(65) Prior Publication Data

US 2004/0096178 A1 May 20, 2004

Related U.S. Application Data

(63) Continuation-in-part of application No. 10/232,078, filed on Aug. 30, 2002.

(51) Int. Cl.[7] .................................................. G02B 6/00
(52) U.S. Cl. .............................................. 385/140; 385/73
(58) Field of Search ............................. 385/140, 73, 78, 385/77, 76, 53, 70, 72, 84, 56, 59, 60, 134, 139

(56) References Cited

U.S. PATENT DOCUMENTS

| | | | |
|---|---|---|---|
| 4,353,620 A | * 10/1982 | Schultz | 385/70 |
| 4,544,234 A | 10/1985 | DeVeau, Jr. et al. | |
| 4,691,986 A | 9/1987 | Aberson, Jr. et al. | |
| 4,856,865 A | * 8/1989 | Lee | 385/67 |
| 4,986,627 A | 1/1991 | Boscher et al. | |
| 5,073,004 A | * 12/1991 | Clayton et al. | 385/72 |
| 5,136,681 A | * 8/1992 | Takahashi | 385/140 |
| 5,319,728 A | * 6/1994 | Lu et al. | 385/140 |
| 5,319,733 A | * 6/1994 | Emmons et al. | 385/140 |
| 5,619,610 A | * 4/1997 | King et al. | 385/139 |
| 5,633,963 A | * 5/1997 | Rickenbach et al. | 385/70 |
| 5,734,778 A | * 3/1998 | Loughlin et al. | 385/140 |
| 5,751,874 A | * 5/1998 | Chudoba et al. | 385/139 |
| 6,311,010 B1 | * 10/2001 | Medeiros | 385/140 |
| 6,341,191 B1 | * 1/2002 | Takahashi | 385/140 |
| 6,707,980 B2 | * 3/2004 | Holman et al. | 385/140 |

\* cited by examiner

Primary Examiner—John R. Lee
Assistant Examiner—James P. Hughes

(57) ABSTRACT

A fiber optic cable suitable for blowing into and through ducts containing pressurized gas, such as natural gas, has the fibers therein arranged in arrays that form longitudinally extending vents. The vents are blocked from transmission of any gas by each being filled with a compliant member which assumes the cross-sectional shape of the vents thereby blocking it.

In a second embodiment of the invention, the first and third ferrules are fixed within the housing with their offset bores in alignment. A second ferrule is interposed between the first and third ferrules and is mounted in a rotatable member for misaligning the bore in the second ferrule with the bores in the first and third ferrule to produce attenuation of a signal passing through the ferrules by misaligning the fibers contained in the bores.

9 Claims, 4 Drawing Sheets

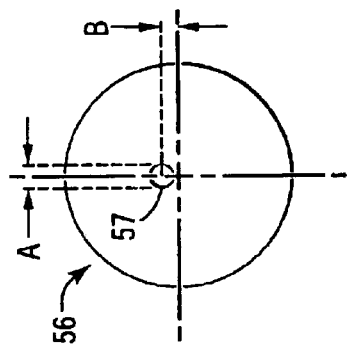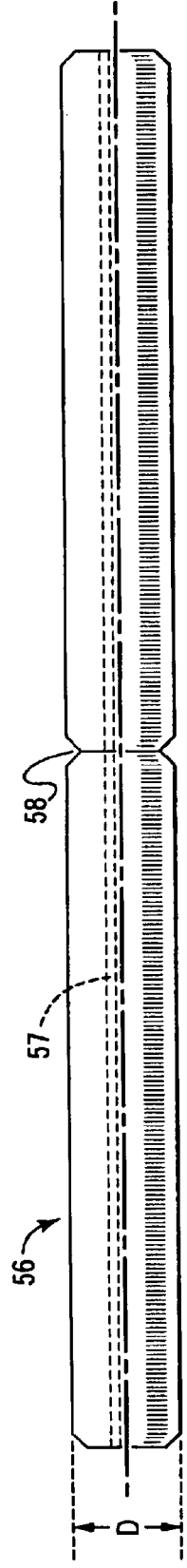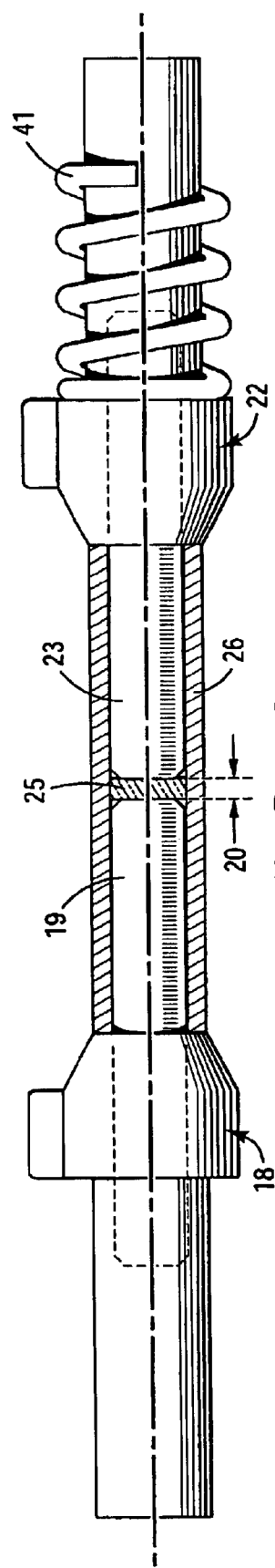
FIG 2a
FIG 2b
FIG 3

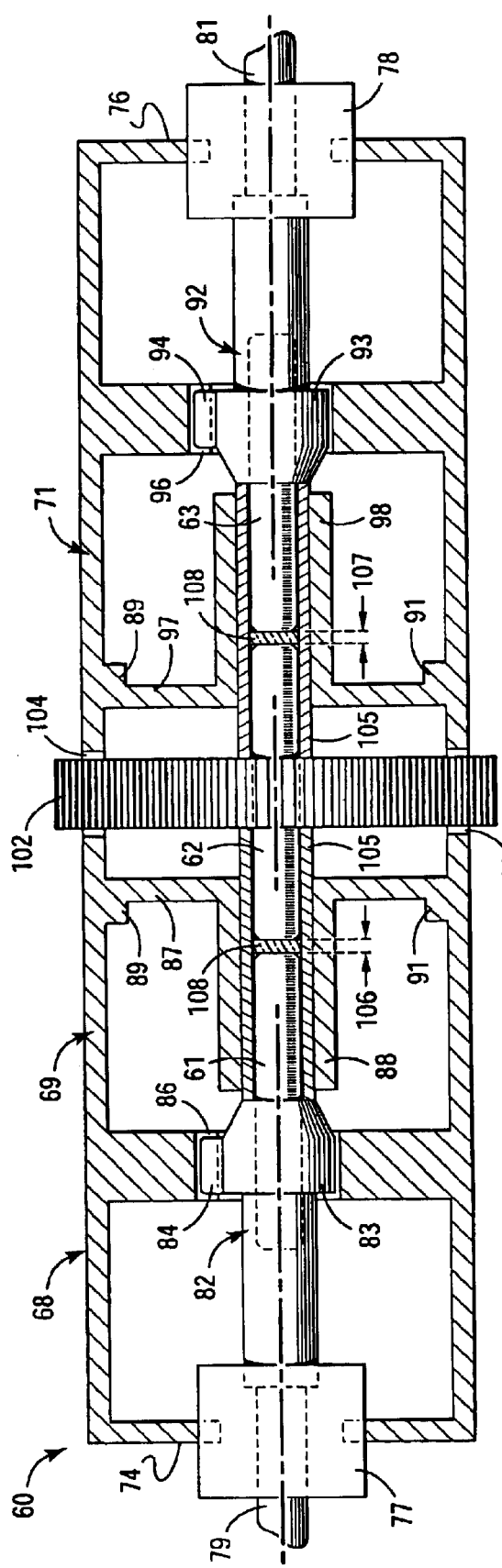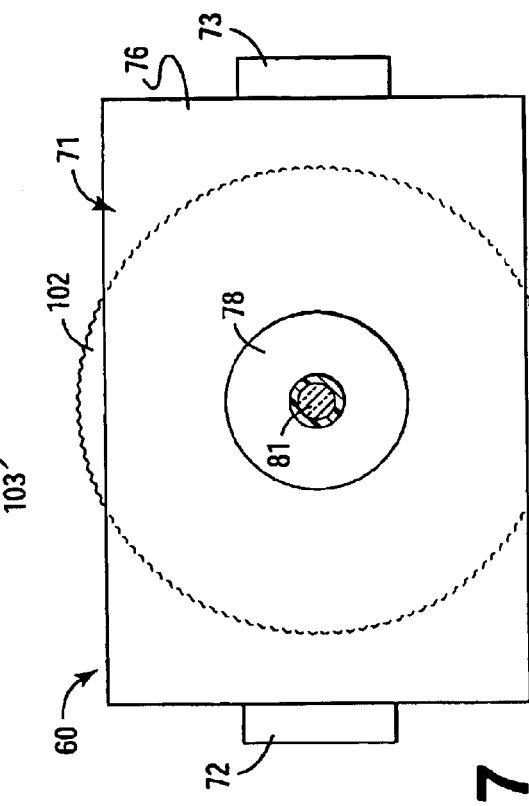
FIG 6
FIG 7

VARIABLE ATTENUATOR FOR OPTICAL FIBER APPLICATIONS

CROSS-REFERENCE TO RELATED APPLICATION

This application is a continuation-in-part of copending U.S. utility application entitled, "Variable Attenuator for Optical Fiber Applications and Method of Making," having Ser. No. 10/232,078, filed Aug. 30, 2002 of Jones, et al, which is entirely incorporated herein by reference.

RELATED APPLICATIONS

This application deals with subject matter similar to that in U.S. patent application Ser. No. 10/061,601 of Robert Holman, et al, filed Jan. 31, 2002, the disclosure of which is incorporated herein by reference.

FIELD OF THE INVENTION

This invention relates to end-to-end connection of optical fibers, and more particularly, to a variable attenuator for use in such connections.

BACKGROUND OF THE INVENTION

Fiber optics has become, in most cases, the preferred mode of signal transmission, especially where the signals are in the higher frequencies. Optical fibers produce greatly increased bandwidth over conventional electrical conductors, and are relatively immune to ambient conditions that can disrupt electrical signal transmission. The numerous advantages of optical fibers come with a price, however. Whereas with electrical conductors, splicing may be had by simply butt welding, soldering, or otherwise joining the ends of the conductors being spliced, such is not presently possible with optical fibers, which have a diameter of, for example 125 microns and a core diameter of from 6 to 30 microns, and, in a satisfactory splice, must permit light transmission with a minimum of insertion loss while providing a stable junction. As a consequence, there has been a constant and ongoing effort to achieve, in a connector splice arrangement, an alignment of the butting ends of the fibers to minimize insertion loss. In addition to alignment, the width of the gap between the fiber ends and the surface condition of the ends are factors which must be considered in reducing or minimizing loss. The prior art arrangements are, for the most part, dependent upon or directed toward the centering of the fiber cores, and in most instances, the fibers are contained in ferrules which have centered fiber containing bores therein. On the other hand, in U.S. Pat. No. 4,544,234 of DeVeau et al., the fibers are contained in a slotted tube and centered prior to their being cemented in place within the slot. Such an arrangement does not require centering of the bores of the ferrules, but it does not permit relative movement between the fibers for optimum transmission after the fibers are cemented in place.

In U.S. Pat. No. 4,691,986 of Aberson et al., the disclosure of which is incorporated herein by reference, there is shown an arrangement wherein alignment of the fiber containing bores of plugs or ferrules is achieved, thereby obviating at least to a large extent alignment of the fiber cores. The invention of that patent involves the use of "contiguous" plugs derived from contiguous segments of tubular stock, with the contiguous ends being the mating ends, with the rotational relationship between the plugs being that that existed prior to cutting or sectioning of the tubular stock. With such an arrangement, the fiber containing bores are automatically aligned. It doesn't matter if the bores are slightly eccentric relative to the outer diameter of the plugs, they will still be aligned, thereby enabling alignment of the fiber cores. The invention of that patent is usable in almost any of the large variety of prior art connectors wherein the fibers are contained within ferrules or plugs.

The foregoing is directed to the general problems inherent in most fiber connectors of achieving proper fiber alignment in connectors or splices. These problems also exist in various optical fiber components, such as, for example, variable attenuators. In U.S. Pat. No. 4,986,627 of Boscher et al., there is shown a variable attenuator arrangement that has abutting ferrules having substantially identical outer diameters, but with fiber containing bores which are eccentric with respect to the outer diameters. The ferrules are contained in a V-block, with one of the ferrules being affixed thereto. The bores, each of which has a diameter substantially the same as the outer diameter of the fiber contained therein, are rotatable relative to each other to vary the alignment of the fibers relative to each other and thereby to vary the attenuation by increasing or decreasing the offset between the fiber cores. Such an arrangement requires, for optimum performance, that, at least one rotational position, the ferrule bores are substantially aligned, thereby aligning the fiber cores at least to the extent possible with whatever eccentricity may exist for the fiber cores themselves. The Boscher et al. arrangement produces an attenuation coefficient which varies between 3 and 60 dB for fibers which are off center by 7 to 10 microns ($\mu$m) for single mode fibers. For multimode fibers, the offset from center is from 30 $\mu$m to 50 $\mu$m.

In addition to arrangements such as shown in Boscher et al, other prior art variable attenuators make use of air gaps and/or angled ferrule (and fiber) ends. Ideally, a variable attenuator should provide the needed or desired attenuation, should have low return loss, and should have stable performance in high power systems and should comprise a single unit that can be inserted within a transmission system between two fiber ends.

SUMMARY OF THE INVENTION

The present invention, hereinafter shown as embodied in a variable attenuator, overcomes or obviates many of the shortcomings of the prior art, as enumerated hereinbefore, while providing reliable desired variations in the attenuation of signals passing therethrough. It should be recognized that in many instances some level of attenuation may be desirable in order to achieve a power balance among several related transmission lines rather than simply a maximum signal power throughput.

The variable attenuator embodying the principles of the invention comprises a fiber connector having a ferrule or glass capillary mounted in a stationary holder and a butting ferrule mounted in a rotatable holder. Glass or similar material ferrules have distinct advantages over ceramic or other material ferrules. A glass ferrule spreads the energy over a large area, thereby preventing energy absorption at the ferrule end face. For high power applications this directing energy away from the end face prevents long term reductions in performance due to heat concentration. The centerlines of the two, substantially identical, ferrules are aligned, and each ferrule has a fiber containing bore extending therethrough, the bores being offset from the ferrule centerline by equal amounts, approximately 35 $\mu$m to 40 $\mu$m. The ferrules are contained in barrel members and their distal ends are spaced from each other by a gap of approximately 5 μm to 15 μm, which is filled with an index matching material. The ferrules are contained in a sleeve of suitable material such as ceramic or metal whose ends butt against the two ferrule containing barrels and which aligns the centerlines of the two ferrules. The sleeve length is the determinant for the width of the gap when the ferrules are completely inserted therein.

Prior to final assembly, the ferrule end faces are polished, either normal to or at an angle to the centerline thereof and the barrels function as stops for the polishing mechanism, thereby insuring that the front face of each ferrule is a desired distance from the front face of the barrel. Thus, the barrel and sleeve together provide a consistent gap which may be normal to or at an angle to the centerline between the distal ends of the ferrule in the production of the attenuators, insuring consistent results among the several attenuators thus produced.

In assembly of the barrels, ferrules, and sleeve, virtual identity of the ferrules is assured by mounting a glass rod on proper diameter and having an offset bore within and extending between the barrels. The rod is then cleaved at the middle thereof, creating two, substantially identical ferrules. The barrels are keyed in a housing against accidental rotation, so that when each barrel/ferrule assembly, when removed from the housing and ferrule distal ends are polished, is replaced in the housing, and the offset bores are in approximately perfect alignment.

One of the ferrules/barrel assemblies is made rotatable with respect to the other by suitable rotating means. Initially, with both barrels keyed in the housing, the offset bores are aligned, as are the ends of the fibers contained therein, and there is substantially no attenuation (0 dB) present in the transmission line into which the attenuator is inserted. Rotation of the rotatable barrel moves the fiber ends out of registry, thereby attenuating the signal within the transmission line. In practice, it has been found that approximately 30° of rotation away from alignment produces approximately 60 dB of attenuation. Thus, the attenuator is capable of producing a range of attenuation from 0 to −60 dB.

In a second embodiment of the invention, first and second ferrules and barrel assemblies containing aligned glass fibers extend from either end of a two part housing member toward the center thereof and are keyed therein to prevent any rotation relative to each other. Between the end faces of the ferrules is a third ferrule having two polished ends mounted to a rotatable member. Each of the two parts of the housing, which are latched together by suitable means, has a wall portion from which extends toward the stationary ferrules a sleeve housing member which contains a sleeve which abuts a planar surface of the rotatable member.

Each sleeve contains one end of the ferrule affixed to the rotatable member and a butting end of the corresponding stationary ferrule. The rotatable member, when rotated, rotates the ferrule affixed thereto which can thereby be positioned to align the fibers in all of the ferrules to yield maximum signal transmission. When the rotatable member is rotated, the fiber in its ferrule becomes misaligned to produce attenuation of the signal in the fibers in the same manner as in the first embodiment, but only a very slight rotation is necessary to produce any equivalent amount of rotation. Moreover, the rotatable member can be rotated as a thumb wheel and does not require any external mechanism for producing the rotation. The ferrules fit within the sleeves including the rotatable ferrule with sufficient tightness to maintain the position to which the rotatable ferrule is moved.

Such an arrangement, in addition to not requiring an external rotating mechanism produces accurate results with only slight rotations of the "thumb wheel" and is particularly amenable to use in the field.

These and other features of the present invention will be readily apparent from the following detailed description, read in conjunction with the accompanying drawings.

BRIEF DESCRIPTION OF THE DRAWINGS

FIG. 2a is a diagrammatic end view of a ferrule showing the offset of the fiber containing bore from the ferrule centerline;

FIG. 2b is a side elevation view of a ferrule blank prior to cleaving to make two substantially identical ferrules;

FIG. 3 is a partial diagrammatic view of the ferrule/sleeve/barrel assembly.

FIG. 6 is a cross-sectional view of the second embodiment of the invention; and

FIG. 7 is an end view of the embodiment of FIG. 6.

DETAILED DESCRIPTION

Figure 1:
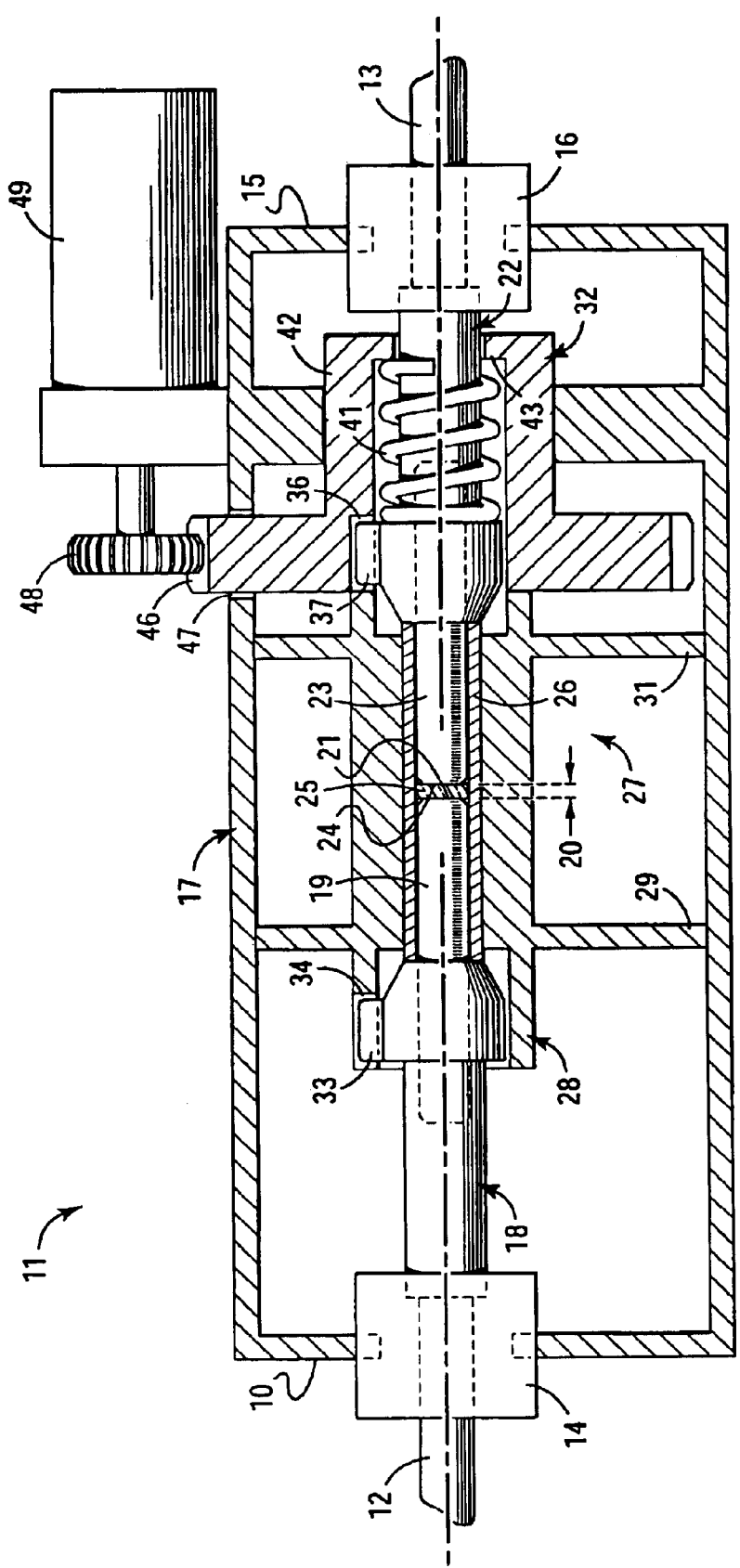
FIG. 1 is a diagrammatic elevation view of the variable attenuator of the invention.

FIG. 1 is a diagrammatic elevation view of the invention as embodied in a variable attenuator 11 which is a stand alone unit for insertion into a transmission line between connector terminated buffered optical fibers 12 and 13. Fibers 12 and 13 are coupled into unit 11 by connector and adapter combinations 14 and 16 respectively, which are shown diagrammatically as blocks, intended here to be representative of any of a number of such combinations known in the art, and which, preferably, are mounted in the ends 10 and 15 of an outer housing 17, which may be of any suitable material such as metal or plastic.

The attenuator assembly comprises a fixed rotary splice housing or barrel 18 which terminates in a capillary or ferrule 19 which contains the end of fiber 12 and which is ground and polished to a flat surface 21 approximately normal to the centerline of the attenuator 11, as shown, but which may be at an angle thereto. A movable rotary splice housing 22 is axially aligned with housing 18 and terminates in a second capillary or ferrule 23 which contains the end of fiber 13 and which is ground and polished to a flat surface 24 which abuts surface 21 preferably over the entire area thereof. Ferrules 19 and 23 are preferably made of glass. The ferrules or capillaries 19 and 23 are preferably covered and held in alignment, especially in the junction region of end faces 21 and 24, by a sleeve 26 of metal or other suitable material which, preferably, is a tight slip fit thereon. The significance and function of the sleeve will be discussed more fully with reference to FIG. 3. The attenuator assembly as thus far described is contained in a housing 27 having a first, stationary part or member 28, mounted to outer housing 17 by any suitable means such as brackets 29, 31, and a movable part or member 32 which is rotatable with respect to member 28. Rotary splice housing 18 is prevented from rotating within member 28 by a key 33 thereon, which fits in a keyway 34 in member 28. It is to be understood that other means for preventing rotation of member 18 might readily be used, that shown here being one alternative. Movable member 32 likewise has a similar keyway 36 into which a key 37 on rotary splice housing 22 fits. Member 32 is rotatably attached to member 28, and, when rotated with respect thereto, causes splice housing 22 to rotate also, and as a consequence, capillary or ferrule 23 to rotate relative to capillary or ferrule 19. In order that the faces 21 and 24 of the ferrules 19 and 23 be protected from damage during rotation they are separated by a gap 20 filled with index matching materials 25. The index matching material 25 may be in the form of a gel, a film, or a plastic wafer, for example. A coil spring 41 is housed in an enlarged portion 42 of member 32 and bears against an enlarged portion of housing 22 and the rear wall 43 of member 32 as shown. The dimensions of the spring 41 and the enlarged portion 42 of member 32 are such that the spring 41 is under compression when the apparatus is assembled, thereby holding the front face of housing 22 firmly against the end of sleeve 26.

Figure 4:
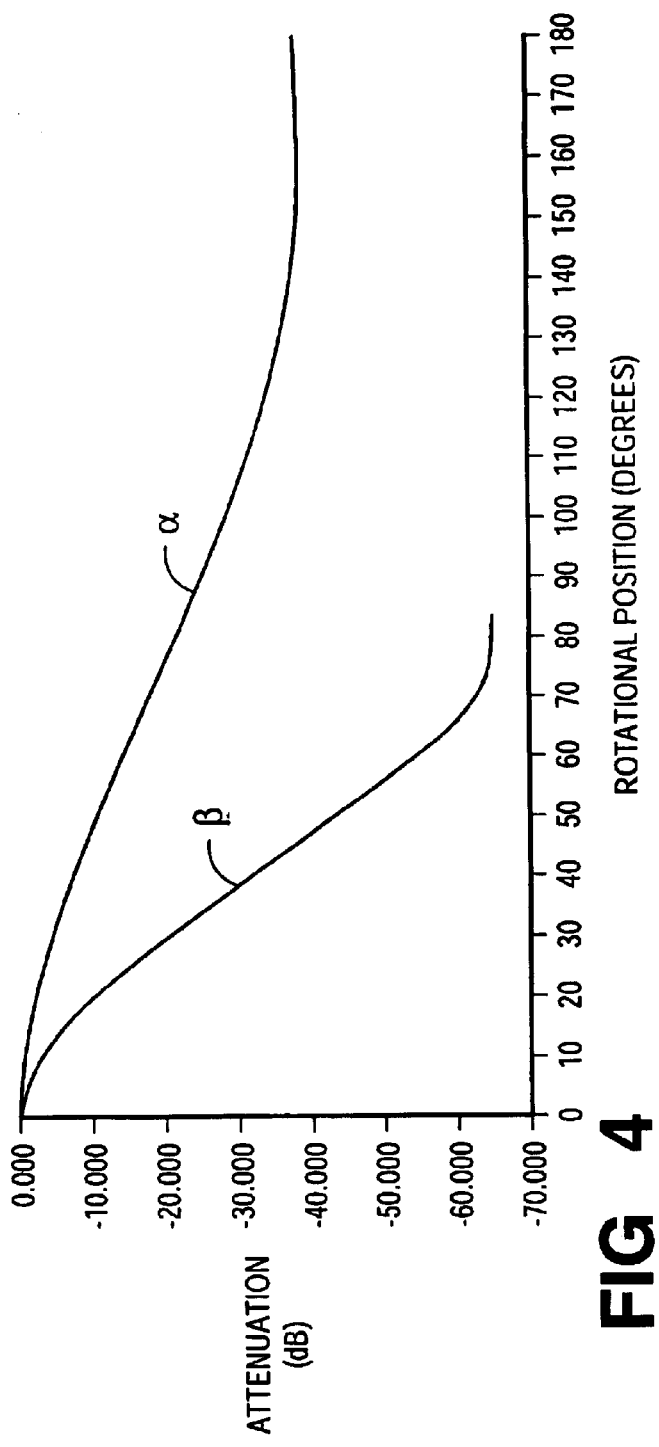
FIG. 4 is a graph illustrating the performance of the attenuator of the present invention.

Rotation of portion or member 32 is by means of an enlarged control wheel 46 which forms part of member 32 and which penetrates to the exterior through a slot 47 in outer housing 17. Rotation of the wheel produces rotation of member 32 and therefore, of housing 22 and ferrule 23. Wheel 46 may be a knurled wheel or, for example, a spur gear or worm driven gear and can be rotated manually or by a driving wheel, gear, or worm 48 driven by a control member 49, preferably a motor. Inasmuch as very small displacement of the wheel 46 will produce substantial variation in attenuation as shown in FIG. 4 it is preferable, although not necessary, that a gearing arrangement for moving wheel 46 be used.

FIGS. 2a and 2b are diagrammatic views of a glass rod 56, having a diameter D of approximately 2.49±0.005 mm from which the ferrules or capillaries 19 and 23 are made. Rod 56 has a bore 57 extending therethrough of a diameter A of approximately 126–129 microns which is displaced from the centerline of rod 56 a distance B of approximately 35–40 microns, and which is parallel to the centerline of rod 56. It is to be understood that the dimensions given herein are preferred for an attenuator for use with single mode fibers having a diameter of 125 microns, but it is to be understood that the values may be called for with different fiber sizes.

In fabricating the attenuator 11, the glass rod 56 is mounted between and affixed to splice housings or barrels 18 and 22, which, in turn, are keyed to their housings 28 and 32. A notch 58 is formed in rod 56 at the midpoint of the length thereof and the glass rod 56 is broken or cleaved at this point. The splice housings or barrels 18 and 22 at this point hold rough ferrules that are substantially identical, with fully mating bores 57 which also defines the zero attenuator position of the keys. It has been found that ceramic or other material ferrules are not amenable to the breaking and polishing for producing the desired results.

Each splice housing or barrel is then removed and the end face (distal end) of its capillary or ferrule is polished. The splice housing or barrel serves as a stop for the polishing mechanism, so that each ferrule has its distal end face spaced from the front face of the distance which is the same for both ferrules. While the polished end faces shown as being normal to the centerline, they can be at an angle thereto so long as the angles are complementary, i.e., the same, to produce a gap of uniform width. After the polishing step, the fiber is inserted into the bore 57 and affixed thereto, with the fiber end being flush with the end face of its ferrule. Some polishing of the fiber end to make it flush is generally necessary.

The ferrules 19 and 23 are then inserted into sleeve 26, with the front faces of barrels or splice housings 18 and 22 butting against the ends of sleeve 26. The length of sleeve 26 is so chosen that there is a gap 20 between their end faces, which is filled with index matching material 25 such as a matching gel. With the foregoing assembly, with keys 33 and 37 in their respective keyways 34 and 36, the offset bores 57 in the ferrules are aligned, as are the fiber therein. In operation, rotation of member 46 and hence, housing 22, produces rotation of end face 24 of ferrule 23 relative to end face 21 of ferrule 19. The gap 20 and matching gel 25 prevent such rotation from causing damage to the end faces. In FIG. 3 the barrel 18, 22 and sleeve 26 arrangement is shown whereby sleeve 26 governs the width of the gap, which, desirably, is from 5 μm to 15 μm. The ends of sleeve 26 butt against the front faces of the barrels 18 and 22, thereby preventing the end faces 21 and 24 from contacting each other. If, in the initial assembly, it is found that the gap 20 thus formed is too wide, it is reduced by grinding one of the ends of sleeve 26 until the desired gap width is achieved. The spring 41 bears against barrel 22 to force it against the sleeve 26, which is, as a result, forced against the front face of barrel or housing 18.

With the width of gap 20 thus set within the range of 5 μm to 15 μm, and it is filled with an index matching material 25, such as silica gel, barrel 22 can then be rotated without damaging end faces 21 and 24 to vary the attenuation in the transmission system, comprising, in the present embodiment, fibers 12 and 13. The results of the rotation are shown in FIG. 4, curve β, as contrasted with the rotation of the ferrules in the aforementioned U.S. patent application Ser. No. 10/061,601 as shown in curve α. It can be seen from these curves that the present invention, as represented by curve β produces the same amount of attenuation, starting at 0 dB, in 45° of rotation as does the prior apparatus in approximately 160° of rotation. Furthermore, because of its unique structure, the attenuation of the invention has a range of from 0 dB to −65 dB, which is reached in approximately 75° of rotation, as compared to the prior attenuation which has a range of from approximately 0 dB to −38 dB.

Figure 5A:
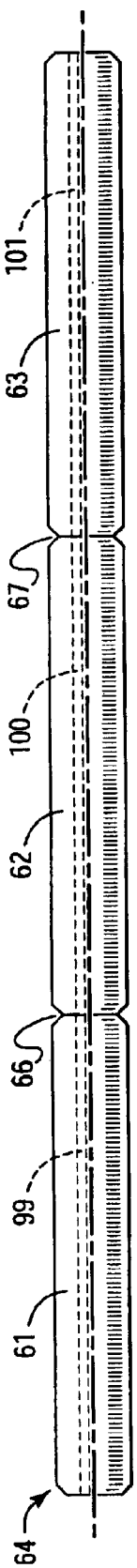
FIG. 5a is a side view and FIG. 5b an end view of a ferrule blank for forming three aligned ferrules, with an offset bore.
Figure 5B:
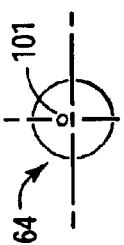

A second embodiment 60 of the present invention is shown in FIG. 6, which utilizes three aligned glass ferrules 61, 62, and 63. The ferrules are formed in the same manner as shown in FIGS. 2a and 2b, except, as shown in FIGS. 5a and 5b the glass rod 64 is notched at 66 and 67 to form three sections 61, 62, and 63, which, as described previously, become the ferrules of the same member.

The attenuator 60 comprises a housing 68 having two sections 69 and 71 which, after assembly, are latched together by suitable means, shown in block form in FIG. 7 as members 72 and 73. At the distal ends 74 and 76 of the sections are mounted adapters and/or connectors 77 and 78, to which incoming and outgoing fibers 79 and 81 are connected. It is to be understood that the connectors and/or adapters 77 and 78 may take any of a number of forms known in the art to accommodate the terminated ends of the fibers. Extending into housing section 69 from connector/adapter 77 is a barrel/ferrule assembly 82 having at its proximal end an enlarged portion 83 within which ferrule 61 is affixed. Portion 83 has a key 84 formed thereon which fits into a keyway 86 mounted within section 69, as shown, and ferrule 61 extends from portion 83. In the proximal end of section 69 is mounted a wall member 87 from which extends toward the ferrule 61 a sleeve housing member 88. Wall member 87 may be integral with section 69 or it may be a separate member mounted within and affixed to section 69, in which case shoulders 89 and 91 serve to locate wall 87 longitudinally.

Section 71 of housing 68 is substantially identical to section 69, having a barrel/ferrule member 92 having an enlarged portion 93 having a key 94; a keyway 96; a wall 97; and a sleeve housing member 98.

As was the case in the first embodiment, enlarged portion 83 and 93 which are bored to receive the glass sections 61 and 63 are mounted thereto with their keys 84 and 94 aligned. The rod 64 is then cleaved at the notches 66 and 67 and the end faces of sections 61 and 63 are then polished. As a consequence of the foregoing, the offset fiber holding bores 99 and 101 are, when the keys 84 and 94 are fitted in their respective keyways, substantially exactly aligned.

Section 62 has mounted thereon a rotatable member 102 and is located between the ends of ferrules 61 and 63 as shown, with the rotatable member 102 protruding from slots 103 and 104, as best seen in FIG. 7. Thus, as assembled, ferrule 62 is rotatable while ferrules 61 and 63 are stationary, being held in place by the keyways and members 77 and 78. The end faces of the ferrules are separated slightly and the gaps 106 and 107 then formed are filled with an index matching material 108 which protects the end faces from damage when ferrule 62 is rotated. The material 108 may be, for example, a gel, a film, or a plastic wafer. The ferrules are inserted in sleeves 105 which, as in the embodiment of FIG. 1, determine the width of the gaps 106 and 107.

Rotation of member 102, and hence, ferrule 62 functions in much the same manner as the rotation of the ferrule 23 by wheel 46 in the embodiment of FIG. 1. However, there results a two stage attenuation, i.e., the attenuation resulting from misalignment of bores 99 in ferrule 61 and bore 100 in ferrule 62, and the misalignment of bore 100 with bore 101 in ferrule 63. As a consequence, only small rotations of member 102 produce larger amounts of attenuation than the arrangement of FIG. 1. It is not necessary, therefore, to have any rotation drive means, as shown in FIG. 1, inasmuch as the desired rotation of member 102, and hence, the desired amount of attenuation can be accurately achieved by hand in which case member 102 may be regarded as a thumb wheel. Inasmuch as the end ferrules 61 and 63 are not rotatable, the device of FIGS. 6 and 7 can be used in a splicing setup wherein the cables do not rotate, or as a connection to an adapter apparatus such as, for example, a circuit board.

From the foregoing, it can be seen that the variable attenuators of the invention produces a wide range of attenuation, extending from zero attenuation, in a relatively small amount of rotation and comprises a relatively simple, reproducible unit adaptable to a wide range of transmission arrangements.

It is to be understood that the various features of the present invention might be incorporated into other variable attenuator mechanism, and that other modifications or adaptations might occur to workers in the art. All such variations and modifications are intended to be included herein as being within the scope of the present invention as set forth in the claims. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. A variable attenuator device for varying signal attenuation within an optical fiber transmission system, said device comprising:

first, second, and third ferrules being affixed to holders and being mounted within a housing, each of said ferrule having an end face adjacent the end face of an adjacent ferrule, said ferrules being in axial alignment with each other;

each of said ferrules having an axially offset fiber containing bore;

the holders of said first and third ferrules being keyed to said housing for aligning their respective bores and maintaining them rotationally fixed;

said second ferrule being interposed between said first and third ferrules and being rotatable with respect thereto; and said ferrules being contained within sleeve members for creating a gap between their adjacent end faces.

2. A variable attenuator device as claimed in claim 1 wherein the holder of said second ferrule is a rotatable member.

3. A variable attenuator device as claimed in claim 2 wherein said rotatable member protrudes from said housing.

4. A variable attenuator device as claimed in claim 1 wherein said first and third ferrules are substantially identical to each other, each of said first and third ferrules having a single end face.

5. A variable attenuator device as claimed in claim 4 wherein said second ferrule has a first end face adjacent the end face of said first ferrule and a second end face adjacent the end face of said third ferrule.

6. A variable attenuator device as claimed in claim 5 wherein a gap separates said first and second end faces from the adjacent end faces of said first and third ferrules.

7. A variable attenuator device as claimed in claim 6 wherein the gap between the end faces of adjacent ferrules are filled with an index matching material.

8. A variable attenuator device as claimed in claim 6 wherein said first ferrule and that portion of the second ferrule having said first end face are contained in a sleeve member which extends from the holder of said first ferrule to the holder of said second ferrule.

9. A variable attenuator device as claimed in claim 6 wherein said third ferrule and that portion of the second ferrule having said second end face are contained in a sleeve member which extends from the holder of said third ferrule to the holder of said second ferrule.

* * * * *